No. 684,738. Patented Oct. 15, 1901.
G. H. ADAMS.
CASE FOR STUFFED BIRDS AND ANIMALS.
(Application filed May 8, 1900.)
(No Model.)

Witnesses:

Inventor:
Geo. H. Adams

UNITED STATES PATENT OFFICE.

GEORGE HENRY ADAMS, OF GRISWOLD, IOWA.

CASE FOR STUFFED BIRDS OR ANIMALS.

SPECIFICATION forming part of Letters Patent No. 684,738, dated October 15, 1901.

Application filed May 8, 1900. Serial No. 15,906. (No model.)

*To all whom it may concern:*

Be it known that I, GEORGE HENRY ADAMS, a citizen of the United States, residing at Griswold, in the county of Cass and State of Iowa, have invented a new and useful Case for Holding and Displaying Stuffed Birds or Animals or other Articles, of which the following is a specification.

My invention relates to improvements in cases for holding and displaying stuffed birds or animals or other articles; and it contemplates the provision of a case having a concave—*i. e.*, a hollow and curved or rounded—receptacle for the stuffed birds or animals or other articles to be displayed, the said receptacle being designed to bear a landscape or marine scene, and, by affording a horizon effect, and hence a very natural-looking background, greatly enhance the natural appearance and beauty of the stuffed birds or animals or other articles.

The invention also contemplates providing the receptacle at its edge with a flange, whereby it may be secured in a frame, and equipping the frame with hinged standards, which are calculated to support the frame in an approximately upright position on a table or the like, and when the frame is hung up are adapted to be folded against the rear side of the same.

With the foregoing in mind the invention will be fully understood from the following description and claims when taken in conjunction with the annexed drawings, in which—

Figure 1:
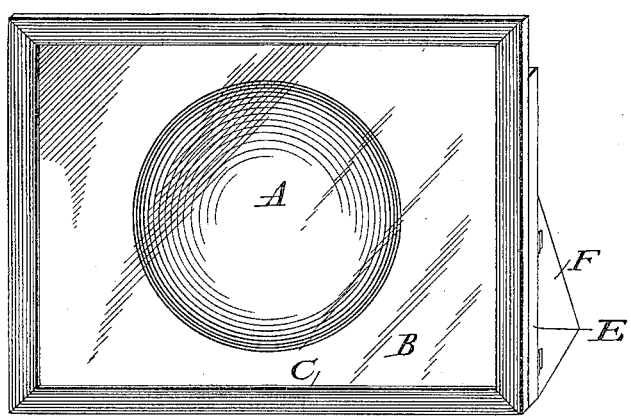
Figure 5:
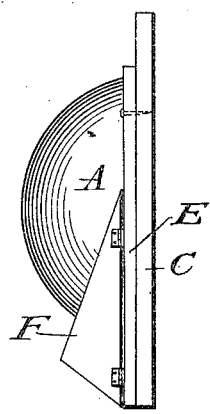
Figure 2:
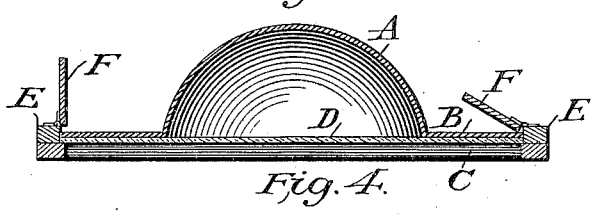
Figure 6:
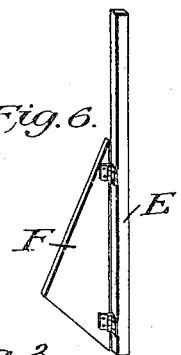
Figure 4:
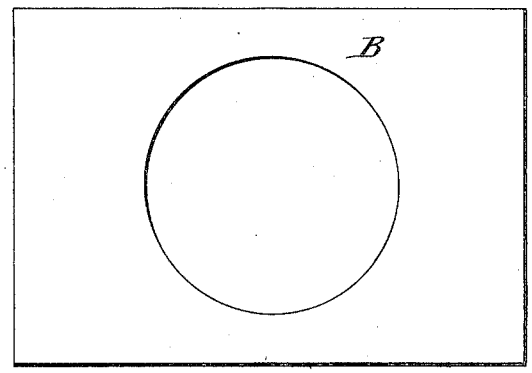
Figure 3:
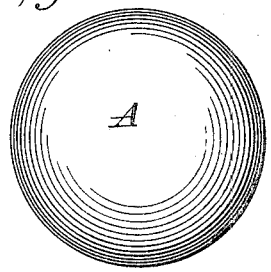

Figure 1 is a perspective view of my improved case as it appears when supported by its standards. Fig. 2 is a horizontal section of the case. Fig. 3 is a rear elevation of a bowl which in one embodiment of the invention constitutes the concave receptacle of the case. Fig. 4 is an elevation of a board which when connected to the bowl constitutes a flange thereon. Fig. 5 is a side elevation of the case, and Fig. 6 is a perspective view illustrating one of the strips to which the standards are connected.

In the said drawings similar letters of reference designate corresponding parts in all of the several views, referring to which—

A is the concave or hollow and curved or rounded receptacle of my improved case, which in the illustrated embodiment of the invention is formed by a bowl, and B is a board which is provided with an aperture to receive the receptacle A and when arranged on said receptacle flush with the edge thereof and connected thereto serves as a flange. It is obvious that when desired the receptacle A might be provided with an integral flange B without departing from the scope of my invention; also, that the shape of the flange B in outline may be varied at pleasure.

C is a frame which is designed to hold the flanged receptacle A and is provided with a glass D, which has for its purpose to protect the contents of the receptacle against dust and injury, and E E are strips which are connected to frame C and are provided with hinged standards F. These standards F are adapted, when swung into a position at right angles to the frame, to support the case in an approximately upright position on a table or the like, and when the case is hung upon a wall said standards are adapted to be swung inwardly, as shown at the right of Fig. 2, so as to be out of the way. The connection of the standards F to the strips E, which in turn are connected to the frame C, contributes greatly to the strength and durability of the case as a whole.

In the practice of my invention a suitable scene is painted on the concave receptacle A or the said receptacle is otherwise ornamented to afford a horizon effect, and consequently a very natural background for the stuffed birds or animals or other articles which are placed in said receptacle. The face of the flange B is also ornamented in any suitable manner, after which the flanged receptacle is placed and secured in the frame C in the same manner that pictures are secured in their frames or in any other suitable manner. It will be appreciated from the foregoing that my improved case is simple and inexpensive in construction, and yet is calculated to materially enhance the natural appearance and beauty of stuffed birds or animals and other articles as well as protect the same against dust and injury.

Having described my invention, what I claim, and desire to secure by Letters Patent, is—

1. A case for holding and displaying stuffed birds or animals or other articles, having a concave—i. e., a hollow and curved or rounded—receptacle for said articles, said receptacle being arranged with its concavity foremost so as to afford a horizon effect and natural background for the articles.

2. A case for holding and displaying stuffed birds or animals or other articles comprising a frame provided with a glass, a concave or hollow and curved or rounded receptacle arranged with its open side toward the glass, and having a flange secured in the frame, strips connected to the frame at the back and adjacent to the vertical edges thereof, and standards connected in a hinged manner to the said strips.

3. A case for holding and displaying stuffed birds or animals or other articles, comprising a frame provided with a glass, and a concave—i. e., a hollow and curved or rounded—receptacle suitably connected with the frame and arranged with its open side adjacent to the glass thereof.

GEORGE HENRY ADAMS.

Witnesses:
HELEN ADAMS,
J. A. TOTTON.